F. J. JARECKI.
MEAT HOLDER.
APPLICATION FILED NOV. 2, 1920.

1,365,410.

Patented Jan. 11, 1921.
2 SHEETS—SHEET 1.

Inventor
Frank J. Jarecki
By Frank E. Liverance, Jr.
Attorney

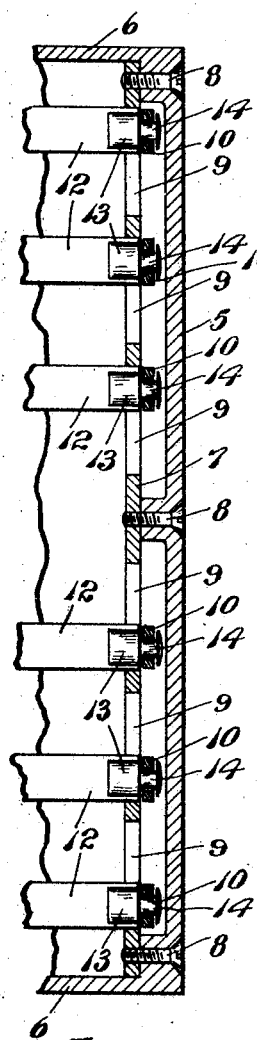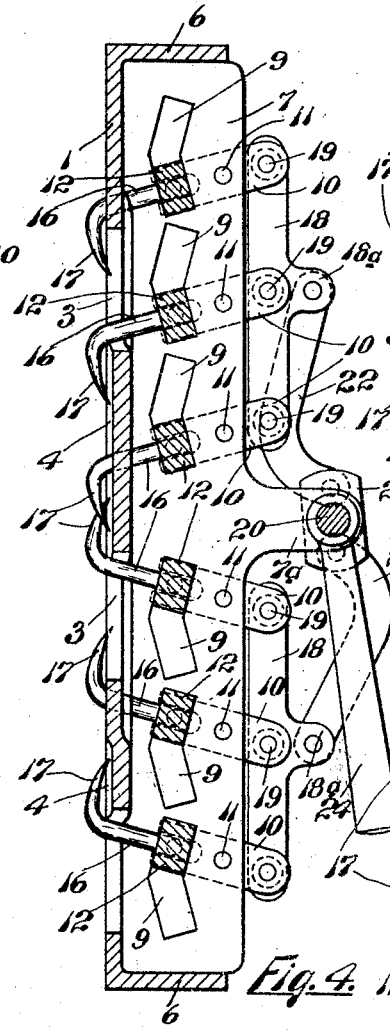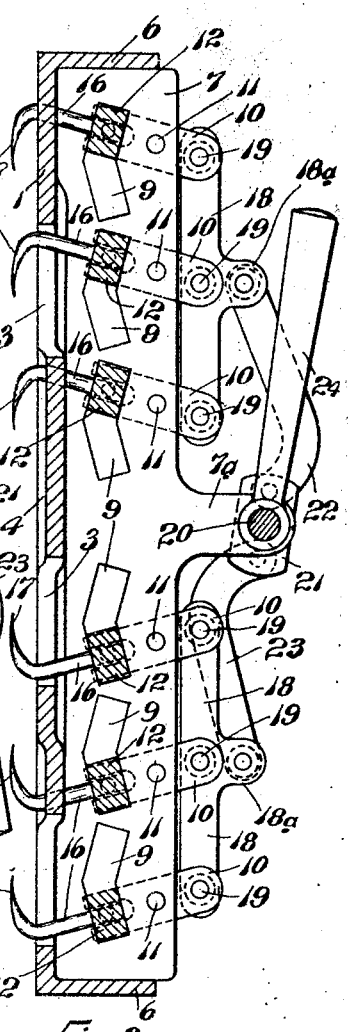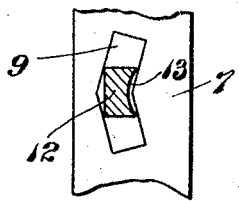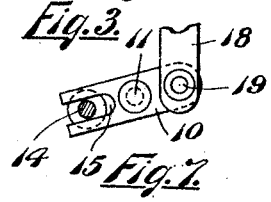

UNITED STATES PATENT OFFICE.

FRANK J. JARECKI, OF GRAND RAPIDS, MICHIGAN.

MEAT-HOLDER.

1,365,410.     Specification of Letters Patent.     Patented Jan. 11, 1921.

Application filed November 2, 1920. Serial No. 421,311.

*To all whom it may concern:*

Be it known that I, FRANK J. JARECKI, a citizen of the United States of America, residing at Grand Rapids, in the county of Kent and State of Michigan, have invented certain new and useful Improvements in Meat-Holders; and I do hereby declare the following to be a full, clear, and exact description of the invention, such as will enable others skilled in the art to which it appertains to make and use the same.

This invention relates to a meat holding appliance which is designed for application to the table of a meat slicing machine for use in holding short lengths of meat or small pieces such as are left after considerable quantities have been cut from the larger pieces held in the usual manner on such machines, but which when reduced in size cannot be held longer on the machine in the usual way and with the ordinary means. With my invention, the smaller remaining pieces, usually known as butt ends, may be placed against the appliance which is positioned vertically in use, with the flat surface left with the last slicing therefrom pressed against the vertical side of the appliance, and the same firmly gripped and secured against the appliance so that the cutting knife of the slicing machine may act thereon and the butt ends completely sliced and worked up without waste of any of the meat. The present invention is a carrying forward and improvement on the construction shown in my pending application Ser. No. 390,380, filed June 21, 1920, and is concerned with many novel changes in construction thereover and arrangements of parts for securing easier and more positive action of the hook carrying bars thereof, without binding or catching of any of the parts of the mechanism, and without sacrifice of any of the effectiveness of the appliance for holding butt ends of meat securely and with insurance that the same cannot come loose during the operation of slicing thereof.

For an understanding of the invention and the construction used in embodying the same, reference may be had to the following description, taken in connection with the accompanying drawings, in which the construction is shown, and in which, Figure 1 is a front elevation of the meat holder.

Fig. 3 is a vertical section through the meat holder showing the meat securing hooks in open position.

Fig. 4 is a similar section showing the hooks operated to closed meat securing position.

Fig. 5 is a fragmentary vertical section taken at one end of the meat holder and paralleling the face plate thereof and looking toward the rear side of said face plate.

Fig. 6 is a fragmentary detail of construction, partly in section illustrating the guide slots at the ends of the hook bars of the construction, and Fig. 7 is a fragmentary detail illustrating the connection of the hook bars at their ends to the actuating levers therefor.

Like reference characters refer to like parts in the different figures of the drawings.

Figure 1:
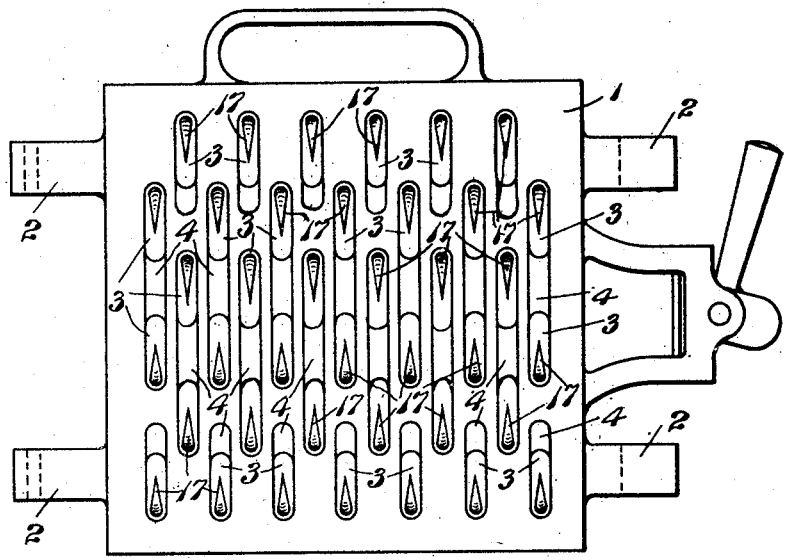
Figure 2:
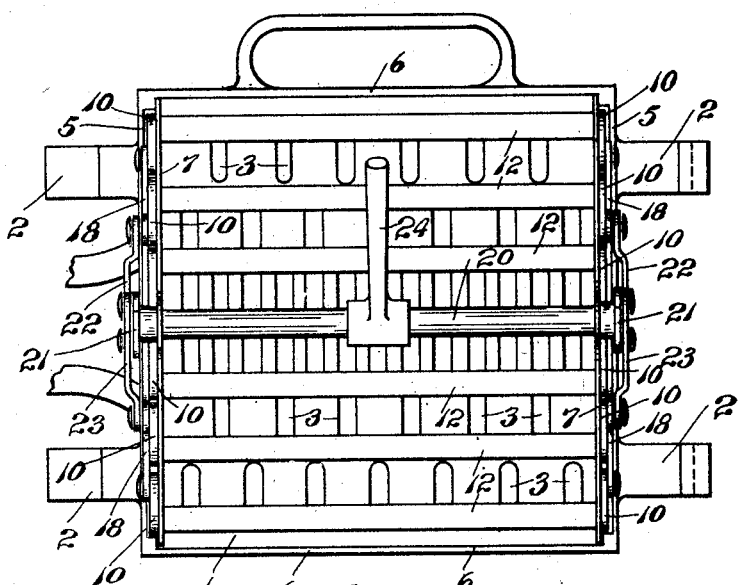
Fig. 2 is a rear elevation thereof.

The plate 1 is of rectangular form and at each vertical side is formed with projecting attaching loops 2 by means of which it may be secured in vertical position on and above the table of a meat slicing machine, the loops engaging with vertical posts projecting above the table as is well known to all familiar with machines of this character. In the plate a plurality of vertical slots 3 are made adjacent one end of which vertical depressions 4 are made on the front side of the plate, the depressions in the upper half of the plate extending downwardly from the lower ends of the slots and in the lower half of the plate upwardly from the upper ends of the slots.

At each side of the plate, sides 5 extend to the rear and, similarly upper and lower sides 6 extend from the upper and lower edges of the plate, being formed integral therewith. A guide plate 7 is located alongside each side 5, being spaced a short distance inwardly therefrom and connected thereto by screws 8. Each of the plates 7 is slotted at a number of points in its length, the slots 9 each having two parts disposed at an angle to each other as shown. In practice six slots are made in the length of each plate 7 in two series of three each, which series are located in each plate one above the middle and the other below the middle of the plate. It is evident, however, that the number of slots 9 in each plate 7 is not necessarily limited to any specific figure but may be varied if desired.

A lever 10 for each slot 9 is pivotally mounted on plates 77, there being, in the present construction, six of such levers on each plate. The levers are pivotally mounted, as at 11, at points between their ends, and each at its rear end extends beyond the rear edge of its associated plate 7. Bars 12 are disposed horizontally between the plates 7 and at their ends pass through the slots 9, each bar at each end and at its rear side being formed with a concaved recess 13 for passage over the angle made at the rear side of each slot at the juncture of the two branches thereof. Each bar at each end has a headed pin 14 projecting therefrom, and the associated levers 10 at their front inner ends are longitudinally slotted, as shown at 15, pins 14 being received in the slots. From each bar 12 a plurality of pins 16 project through the slots 3 in plate 1, each pin after passage through the plate being bent substantially at right angles to make a hook 17. Each hook is sharpened to a point, and the hooks on the three upper bars 12 are turned downwardly while those on the three lower bars are turned upwardly.

A link 18 connects the outer ends of the levers 10 at each side of the plate and both above and below the middle of the guide plates 7. There are four of the links 18 and each pivotally connects with the ends of three levers 10 at 19. Guide plates 7 are each formed with rearwardly extending ears 7ª substantially at their middle points between and through which a rock shaft 20 passes, it having rotatable mounting in said ears. At each end of the rock shaft a short bar 21 is fixed. Links 22 and 23 are pivotally connected to opposite ends of the bars 21 and extend upwardly and downwardly therefrom, respectively, having pivotal connection at their outer ends to outwardly projecting ears 18ª made on the lever links 18. A handle 24 secured to rock shaft 20 between its ends is used for manual operation of the rock shaft.

In the operation of the construction described, handle 24 may be moved from upper position shown in Fig. 3 to the lower position shown in Fig. 4, the hooks 17 in the former position being open and in the latter closed, this movement occurring through the turning of levers 10 and the consequent movement of bars 12 along slots 9. With the hooks in the position shown in Fig. 3, meat may be pressed against the plate and as the hooks move to the other position, they enter the meat and with the completion of the movement turn in toward the plate forcing the meat snugly against the plate. The first movement of the bars 12 effects an entrance of the hooks into the meat, the final movement a drawing of the hooks and meat engaged thereby against the plate 1. The three upper bars move downwardly and the three lower bars upwardly. The grooves at 4 furnish spaces for the points of the hook to enter with a consequent wedging and pinning of the meat back of the hooks into said grooves. The meat is positively secured in place and cannot become loose except on upward operation of the handle 24.

This construction is particularly practical and effective. The movement is smooth and even. The construction has proved its merit in practice, being especially sure and positive in its operation and for the accomplishment of the ends for which it is designed. Any variation from the specific detail of construction coming within the scope of the appended claims defining the invention, is to be considered as comprehended by the invention which is not to be considered as limited to the exact structure shown and described.

I claim:

1. A meat holder for slicing machines comprising a plate, a series of hook bars movably mounted thereon, and pivotally mounted levers to which said hook bars are pivotally and slidably connected, substantially as described.

2. A meat holder for slicing machines comprising a plate, a series of hook bars slidably mounted thereon, and levers pivotally mounted on the plate and engaging with the ends of the hook bars for moving the same with reference to the plate, substantially as described.

3. A meat holder for slicing machines comprising a vertical plate, a series of horizontal hook bars rotatably and slidably mounted on the plate, a pair of levers for each hook bar pivotally mounted on the plate at opposite ends of the levers, and operative connections between one end of each lever and the adjacent end of its associated hook bar for operating the hook bar by said pair of levers, substantially as described.

4. A meat holder for slicing machines comprising a vertical plate, a series of horizontal hook bars slidably and rotatably mounted on the plate, a pair of levers for each hook bar pivotally mounted between their ends on the plate at opposite ends of the levers, links connecting the outer ends of the levers at one end of said bars, and operative connections between the inner ends of the levers and their associated hook bars, substantially as described.

5. A meat holder comprising a plate having a plurality of openings therethrough, a set of hook bars located back of the plate and carrying hooks projecting through the openings in the plate, means for mounting the bars for sliding and rotary movements, a pair of levers for each bar pivotally mounted each between its ends on the plate and at opposite ends of the bars, operative connections between the inner ends of the levers and the adjacent ends of their associated bars, links pivotally connecting the outer ends of the links at each side of the plate, and means for simultaneously moving said links longitudinally, substantially as described.

6. In a meat holder, a plate having a plurality of slots therein, upper and lower sets of hook bars mounted for sliding and rotary movement back of the plate, a pair of levers for each hook bar pivotally mounted on the plate, one at each end of each bar, a pair of links connecting the levers for the upper hook bars, a similar pair of links connecting the levers for the lower hook bars, means operatively connecting the inner ends of the levers with the ends of their associated hook bars, means for simultaneously operating the links longitudinally to move the upper links toward the lower links or vice versa, and hooks on the hook bars extending through the slots in the plate.

7. A meat holder for slicing machines comprising a plate having a plurality of slots therein, hook bars slidably and rotatably mounted on the plate and having hooks extending through the slots therein, pins projecting from the ends of the hook bars, levers pivotally mounted on the plate between their ends, the inner ends of said levers being slotted and receiving said pins in the slots thereof, and means for simultaneously operating all of the levers, substantially as described.

8. In a meat holder, a plate having slots therein, a hook bar slidably and rotatably mounted on the plate, a pair of levers pivotally mounted on the plate one at each end of the hook bar, said levers at their ends adjacent the ends of the bar being longitudinally slotted, pins projecting from the ends of the bar and entering said slotted ends of the levers, and hooks on the hook bar passing through the slots in the plate.

In testimony whereof I affix my signature.

FRANK J. JARECKI.